000# United States Patent [19]

Pollock

[11] 4,229,406
[45] Oct. 21, 1980

[54] METHOD FOR PREPARING AN EMBOSSED FOAMED LATEX SHEET

[75] Inventor: Richard Pollock, Grangemouth, Scotland

[73] Assignee: Borg-Warner Corporation, Chicago, Ill.

[21] Appl. No.: 5,109

[22] Filed: Jan. 22, 1979

Related U.S. Application Data

[62] Division of Ser. No. 525,796, Nov. 21, 1974, abandoned.

[51] Int. Cl.² .............................................. B29D 27/00
[52] U.S. Cl. .................................... 264/321; 264/45.3; 264/293; 264/331; 264/DIG. 66; 428/403
[58] Field of Search .............. 264/45.3, 321, DIG. 17, 264/293, DIG. 66, 331; 428/403

[56] References Cited

U.S. PATENT DOCUMENTS

| 3,070,476 | 12/1962 | Miller . | |
|---|---|---|---|
| 3,083,124 | 3/1963 | Rahmes . | |
| 4,022,856 | 5/1977 | Maxey | 264/45.3 X |

Primary Examiner—Philip Anderson
Attorney, Agent, or Firm—Richard J. Schlott

[57] ABSTRACT

Embossable foam latex compositions prepared by dispersing into a foam latex from 20 to 150 parts by weight per hundred parts of latex solids of a powdered particulate material having a melting point in the range 90° to 200° C. Embossing of foam-backed carpet or foam sheet material prepared from these latex compositions is readily accomplished by heating the foam structure to the melting temperature of the dispersed particulate material, then passing the foam through a cold embossing roll to chill and set the foam in place.

3 Claims, No Drawings

METHOD FOR PREPARING AN EMBOSSED FOAMED LATEX SHEET

This is a division of application Ser. No. 525,796 filed Nov. 21, 1974, now abandoned.

BACKGROUND OF THE INVENTION

This invention relates to a method for embossing foamed polymeric sheet materials such as those employed in carpet backing, underlayment and the like.

The preparation of textured or embossed cellular or foam polymeric material and in particular of elastomeric foam materials has always presented some difficulty. Prior art approaches have included the application of embossing rolls to the foam sheet material under controlled temperature conditions to collapse the foam in predetermined areas, producing the desired pattern, and chemical methods in which the foaming agents or reactive crosslinking agents are applied in preselected areas on the surface of the polymeric material prior to foaming either to selectively foam the areas intended to be raised or alternatively to crosslink the areas intended to become depressed, unfoamed regions after the foaming step. The technique of collapsing the foam by means of embossing rolls requires careful control of the temperature and pressure conditions prevent a general collapse of the foamed material. Chemical methods are difficult to apply, often requiring added processing equipment to place the chemical agents in the desired areas accurately, and further steps are needed to ensure that a complete and stable foam structure results. Additionally, these methods have proved less than efficacious when applied to elastomeric foams and in particular to non-gel latex systems such as are commonly employed as backing for textile structures, as for example, in carpets and in foam rubber underlayment.

Accordingly, a method for embossing foam sheet material rapidly which would result in stable embossed patterns and which could readily be applied to the production of elastomeric foam-backed textiles, carpets and elastomeric foam sheet for underlayment and the like, is clearly needed.

SUMMARY OF THE INVENTION

It has now been found that foam compositions having dispersed therein moderate amounts of such materials as powdered PVC resins, polyolefins, waxes, and the like may be readily embossed after foaming by the simple step of passing the foam sheet through chilled embossing rolls. More particularly, foamed latices which have dispersed therein particulates having a melting point at or near the foam processing temperature can be readily embossed by first raising the foam composition to the melt temperature of the admixed particulate material, then passing the foamed material under an embossing roll, cooling and "setting" the admixed material, thus holding the foam in place in the areas depressed by the embossing roll.

The present invention is particularly useful for embossing patterns on the under-surface of resilient latex foam-backed carpet, and may be employed for the embossing of one or both surfaces of resilient, foamed elastomeric sheet underlayment material. The embossed patterns are readily capable of withstanding compression deformation in use, and are not lost from the foam structure during cleaning nor during use or storage at the normally encountered environmental temperatures and conditions.

DETAILED DESCRIPTION OF THE INVENTION

Carpeting and textile materials for floor covering and the like are coated on the under-surface with a foamed resilient elastomeric composition. Such coating or backing is normally produced by spreading on the under-surface a rubber latex foam composition formulated with suitable stabilizers, fillers, gel stabilizers, thickeners and the like. The coated fabric is then further treated by passing it through a drying process to remove the volatile components and particularly water, and heated to set the elastomeric foam. The elastomeric foam composition, if suitably formulated, also undergoes crosslinking to give a gelled, foamed structure, however, non-gelled foams are also employed for this purpose. Typical elastomers employed for this purpose include styrene-butadiene elastomeric materials and blends of styrene-butadiene elastomers with natural rubber or polyisoprene. The styrene-butadiene rubber may also be of the carboxylated variety wherein minor amounts of a carboxylated monomer such as itaconic acid, citraconic acid, acrylic acid or the like are included in the elastomer monomer composition. Such elastomeric latices are widely employed and sold for use in these applications and are generally termed foamable SBR latices.

The particulate material to be dispersed into the latex for the purpose of rendering the foam embossable is in the form of a finely divided powder. Among the materials usable for the purposes of this invention are polymeric and wax-like materials melting or softening in the range 90° to 200° C., and including powdered polymers such as polyvinyl chloride, polyethylene, polypropylene, polyamides and high melting waxes. It is necessary that the melting or softening temperature lie in the range where the foam is to be processed, and above the maximum eventual use temperature envisioned for the foam product. Materials melting too low are likely to encounter temperatures during use sufficient to soften the material and destroy the embossed pattern. Materials melting significantly higher than the preferred range will be impractical since the foam will be unable to withstand processing at a temperature sufficiently high to melt the particulate material. It will be understood that melting temperature is contemplated as being the temperature at which the particulate material employed will become sufficiently molten or softened to be plastic. Thus for pure compounds this will be a true melting, while for polymeric materials such as PVC the effect will be a softening to a semi-molten plastic state. This temperature, through often referred to as the melting temperature, will be more properly regarded as the softening temperature. The most practical materials will soften or melt near 150° C., and typical of such materials is powdered PVC.

The incorporation of the particulate is accomplished by thoroughly dispersing the powder into a foamable latex prior to casting or coating the fabric structure. The powder will normally be dispersed by a simple mixing operation, and uniform dispersion in the latex is desirable. The amount of powdered material to be employed may be varied over a wide range, and amounts of 20% by weight to 150% by weight of the latex solids have been satisfactorily employed for these purposes. The foaming is then carried out in batch or continuous mixing devices, incorporating air or inert gases to provide a thick froth-like foam.

The application of the foamed latex composition to the carpet may be accomplished by a variety of methods including roller, spray, knife-spreading or doctoring the latex foam onto the surface. The coated structure is then heated to dry and set the foam. The foam is then further heated to the melt temperature of the particulate material to thereby soften or melt the particulate material, and the foam is then passed to a cold embossing roll, where upon the foam composition is chilled and set in dimpled pattern.

The instant invention is applicable to a wide variety of gel and non-gel foamable latex formulations. While the maximum benefit will accrue to use with non-gel foam structures, inasmuch as these have been more difficult to emboss satisfactorily, the application to gel foam systems is contemplated as being within the scope of the invention.

The invention will be more clearly understood by consideration of specific embodiments given as Examples herein below, which are provided by way of illustration.

In the following examples, formulations were prepared employing a foamable non-carboxylated/styrene-butadiene latex. The latex was batch-mixed to give a medium density foam, then spread on the back of 7 oz./sq. yard hessian at a thickness of 4 mm. The coated squares were oven-cured at 140° C. for 15 minutes to dry and set the foam then placed in an oven for 5 minutes. These heated samples were then removed from the oven and passed under a cold embossing roller to imprint the pattern. For these tests, a typical waffle pattern was employed, however a variety of patterned rolls including dimpled, corrugated and the like are widely employed in the industry and may be used with the embossable foam structure of the instant invention.

embossing roll. The nature of the action is that at the high temperature (150° C.) just prior to entering the embossing roll, the dispersed particulate PVC material has reached a semi-molten state. The cold embossing roll serves to depress the foam in the desired pattern and to set the embossed pattern by chilling and solidifying the particulate matter, particularly in the depressed areas, which holds the depressed portions in place. It will be understood that the essential requirement is that the particulate matter to be employed will melt or soften, then solidify rapidly on chilling. The particulate material need not be PVC, and other powdered polymeric materials may be similarly employed, as may high melting wax materials. It will also be noted that the method of preparing the latex composition in combination with the powdered particulate results in a heterogeneous dispersion and not in a solution or blend of the two polymeric components.

The use of PVC in this application additionally imparts beneficial properties to the resulting foam structure, including increased wear resistance, controllable embossing and flame retardance.

The degree of embossing retained will be determined in part by the amount of dispersed powdered particulate employed. Thus, the formulation of Example 2 having only 25 parts PVC/100 parts latex retained only a faint embossing, while the degree of embossing retention increased with level of dispersed particulate PVC through Example 5, employing 100 parts PVC/100 parts latex. Similarly, when flat, unembossed foam slabs were tested in a WIRA Dynamic Load Tester, impacted and measured for thickness loss, formulations of Examples 2 through 5 exhibited markedly improved wear performance, as shown by the data in Table 2.

TABLE I
FOAM FORMULATIONS

| Example: | 1 pbw | 2 pbw | 3 pbw | 4 pbw | 5 pbw | 6 pbw[4] |
|---|---|---|---|---|---|---|
| Material |  |  |  |  |  |  |
| SBR Latex[1] | 100 | 100 | 100 | 100 | 100 | 100 |
| Sulfosuccinamate (Foaming Aid) | 3 | 3 | 3 | 3 | 3 | 3 |
| Amine Oxide (Foam Stabilizer) | 0.5 | 0.5 | 0.5 | 0.5 | 0.5 | 0.5 |
| Sodium lauryl sulfate | 2 | 2 | 2 | 2 | 2 | 2 |
| Sulfur | 2.5 | 2.5 | 2.5 | 2.5 | 2.5 | 2.5 |
| Zinc Oxide | 3.0 | 3.0 | 3.0 | 3.0 | 3.0 | 3.0 |
| Zinc dithiocarbamate | 1.5 | 1.5 | 1.5 | 1.5 | 1.5 | 1.5 |
| Zinc Mercaptobenzothiazol | 1.0 | 1.0 | 1.0 | 1.0 | 1.0 | 1.0 |
| Calcium carbonate | 150 | 150 | 100 | 150 | 100 | — |
| Powdered PVC[2] | 0 | 25 | 50 | 50 | 100 | — |
| Aluminum Hydrate | — | — | — | — | — | 150 |
| Polyacrylate[3] (thickener) | To required viscosity | | | | | |
| Water[5] | 6.95 | 15.95 | 6.95 | 21.95 | 21.95 | 6.95 |

Notes:
[1]SBR latex: non-carboxylated styrene-butadiene latex having 28% bound styrene. Solids content 61%.
[2]Powdered PVC: powdered polyvinyl chloride resin. BP Chemicals Ltds. Breon P 130/1 powder, 300 mesh (maximum) sp/c=0.63–0.69 , 0.5% in cyclohexanone.
[3]Thickener: added to give final Brookfield Viscosity of 3500 cps, RVT #4 spindle @500 RPM.
[4]pbw: parts by weight on dry solids content.
[5]Water: to give final solids content of 77% by weight.

Example 1 is a control formulation prepared without the addition of powdered PVC. This latex, coated on hessian and embossed as described herein above, retained no pattern from the embossing roll. Examples 2–5, containing various levels of the PVC powder, retained the embossed pattern on emerging from the

TABLE II
FOAM TESTING DATA

| Example | 1 | 2 | 3 | 4 | 5 |
|---|---|---|---|---|---|
| Thickness loss (%) |  |  |  |  |  |
| at 100 impacts | 5.9 | 3 | 3.2 | 2.9 | 2.7 |
| at 500 impacts | 8 | 3.5 | 4.4 | 4.2 | 2.7 |
| at 1,000 impacts | 9 | 3.5 | 5 | 4.2 | 2.7 |

Flame retarding tests were run on 10 in. foam-backed hessian samples prepared from Examples 1, 3, 5, and 6 as before but without embossing.

The flame test employed was the so-called "Hot Nut Test", described in British Standards Institution Document 72/700010. The test is run by heating a stainless steel hexagonal nut 15/16 inches across the flats, weighing 30 2 gms. to a temperature of 900°±20° C., then placing it on the foam surface and noting the burn time and char-radius. Carpet backed with foam of Example 1, having no PVC included, had to be extinguished after 180 seconds, and the char-radius reached the edges of the carpet. Example 3 self-extinguished at 120 seconds, with char-radius of 35 mm. Example 5, self-extinguished after 65 seconds, with char-radius of 20 mm. Thus, it will be seen that some improvement in flame resistance is also imparted to the foam when PVC powder is employed as the dispersed particulate material.

It will be understood that the invention described herein consists of a composition including a dispersion of powdered, particulate materials in a latex foam, which impart thereto the embossability as described herein above. The resulting foam latex composition may be employed in the backing of carpets, or to prepare sheet foam material particularly for use as underlayment. The embossing may then be carried out as a part of the production sequence, or the cured foam product may be stored and later embossed, by the procedure of heating the foam to a temperature sufficient to render the particulate component softened or molten, then passing through a cold embossing roll, to quickly cool and solidify the particulate material and thus to hold the foam structure in place.

While only certain specific embodiments have been illustrated and described, it will be apparent to one skilled in the art that modification and alteration may be made without departing from the spirit of the invention, which should be interpreted as broadly as is consistant with the appended claims.

I claim:

1. A method for preparing embossed foam latex sheet consisting of a foamed styrene-butadiene elastomer latex having dispersed therein from 25 to 100 parts per hundred parts of latex solids of a powdered particulate solid having a softening temperature in the range 90°–200° C., said method comprising:

heating said foamed latex sheet to a temperature sufficient to soften the particulate solid; and contacting said heated foamed latex sheet with a cold embossing roll to depress the foam and solidify the particulate solid.

2. The method of claim 1 wherein the particulate solid is selected from the group consisting of polyvinyl chloride, polyethylene, polypropylene and wax.

3. The method of claim 1 wherein the particulate solid is polyvinyl chloride.

* * * * *